US006688802B2

(12) United States Patent
Ross et al.

(10) Patent No.: US 6,688,802 B2
(45) Date of Patent: Feb. 10, 2004

(54) SHRUNK ON INDUSTRIAL COUPLING WITHOUT KEYS FOR INDUSTRIAL SYSTEM AND ASSOCIATED METHODS (75) Inventors: Christopher W. Ross, Oviedo, FL (US); Keith McLaurin, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/950,497

(22) Filed: Sep. 10, 2001

(65) Prior Publication Data

US 2003/0049073 A1 Mar. 13, 2003

(51) Int. Cl.$^7$ ............................................... F16B 21/14
(52) U.S. Cl. ....................................................... 403/337
(58) Field of Search .............................. 403/337, 335, 403/336, 338, 28

(56) References Cited

U.S. PATENT DOCUMENTS

| 1,388,657 A | | 8/1921 | MacDonald et al. |
| 4,167,809 A | | 9/1979 | Boyland et al. |
| 4,204,589 A | * | 5/1980 | Loker et al. ............ 403/335 X |
| 4,244,456 A | * | 1/1981 | Loker ..................... 403/335 X |
| 4,567,649 A | | 2/1986 | Ades et al. |
| 4,570,053 A | | 2/1986 | Ades et al. |
| 4,590,653 A | | 5/1986 | Ades et al. |
| 4,635,336 A | | 1/1987 | Ades et al. |
| 4,671,696 A | | 6/1987 | Suzuki et al. |
| 5,929,550 A | | 7/1999 | Kaminski et al. |
| 6,218,756 B1 | | 4/2001 | Gardner et al. |
| 6,234,729 B1 | | 5/2001 | Cook |
| 6,239,527 B1 | | 5/2001 | Kaminski et al. |
| 6,405,424 B1 | * | 6/2002 | Ferguson ................ 403/337 X |

* cited by examiner

Primary Examiner—John R. Cottingham (57) ABSTRACT

An industrial coupling (30) and associated methods are provided which are adapted to be positioned to connect a first shaft (21) of a portion (12) of an industrial system (10) to a second shaft (23) of a portion (11) of an industrial system (10) so that an industrial member (25) having an opening formed therein and having a preselected opening diameter can be readily positioned over the coupling (30). The industrial coupling (30) preferably has a first coupler portion (31) mounted to and integrally formed with the first shaft (21) and having a first diameter less than the preselected opening diameter of the industrial member (25) so that the industrial member (25) can readily be positioned over the first coupler portion (31) and onto the first shaft (21). The industrial coupler (30) preferably also has a second coupler portion (36) adapted to be mounted on the first coupler portion (31) and having a second diameter greater than the preselected opening diameter of the industrial member (25) when mounted on the first coupler portion (31) so that the industrial member (25) after being positioned onto the first shaft (21) cannot be readily positioned over the coupling (30).

15 Claims, 5 Drawing Sheets

SHRUNK ON INDUSTRIAL COUPLING WITHOUT KEYS FOR INDUSTRIAL SYSTEM AND ASSOCIATED METHODS

FIELD OF THE INVENTION

The present invention relates to the industrial coupling industry and, more particularly, to industrial couplings and related methods particularly for industrial system industries.

BACKGROUND OF THE INVENTION

In an industrial system such as a power generation system, for example, a rotor is conventionally positioned within a stator to generate power through magnetic induction as the rotor rotates within the stator. The rotor has a plurality of coils positioned in slots formed in the outer surface of the body of the rotor and also has coil end-windings which also extend along the proximal and distal end peripheries of the rotor body. These end-windings are often protected by a retaining ring that is positioned over the rotor shaft and substantially surrounds and retains the end windings within a predefined area. Additionally, an end plate is often placed over the end windings to protect the end windings in the axial direction, and likewise, the retaining ring protects the end windings in the rotational direction.

In such a power generation system, for example, between the generator rotor and a turbine, the shaft 71 from the rotor 72 and the shaft for the turbine often couple together. In order to get a retaining ring 75 or end plates over the coupling 70 of the rotor shaft 71, the retaining ring 75 has to have an outside diameter larger than the rotor shaft coupling 70. If this is not the case, the coupling 70 cannot be integral with the shaft. For strength purposes, the coupling 70 is preferably formed integral with the rotor shaft 71 as shown in Prior Art FIG. 2. As an alternative, and as shown in Prior Art FIG. 3, the coupling 80 for the rotor 82 is often placed on the rotor shaft 81 after the retaining ring 85 is mounted into position over the rotor shaft 81 and over the end windings 87. The coupling 80 can then be heat shrunk onto the shaft 81 by techniques well understood by those skilled in the art and such as shown in U.S. Pat. No. 4,671,696 by Suzuki et al. titled "Shaft Assembly And Manufacturing Process Thereof," U.S. Pat. No. 4,567,649 by Ades et al. titled "System For Heating, Disassembly, Handling And Reassembly Of A Turbine Rotor," and U.S. Pat. No. 6,234,729 by Cook titled "Shrink Fit Shoulder Interface." To keep the coupling 80 and shaft 81 alignment from shifting, however, separate shaft keys 88 are often used to enhance the strength, position, and alignment of the coupling 80 with the rotor shaft 81. A problem with a shrunk-on type coupling 70 (FIG. 2) requiring keys 88 is that it is much more labor intensive, requires more parts, and also reduces the strength of the coupling connection with the shaft 81. Accordingly, there is a need for a coupling that does not require keys and enhances the overall strength of the connection.

SUMMARY OF THE INVENTION

With the foregoing in mind, the present invention advantageously provides a power generation system or other industrial system having an industrial coupling, and associated methods, which advantageously strengthens the connection between an industrial coupling and a shaft. The present invention also provides a power generation system having an industrial coupling which advantageously is easier to mount and assemble and has fewer parts to couple the rotor shaft to the turbine shaft in a power generation system or other industrial couplings. The industrial coupling of the present invention is also advantageously less expensive and easier to manufacture because it has fewer parts and is particularly advantageous for situations where the diameter of the coupling up to the through bolt openings is less than the inside diameter of the opening formed in the retaining ring, end plate or other industrial member which needs to be positioned over the rotor shaft and the coupling. Advantageously, to accomplish this, the present invention allows the strength of the coupling to be transferred directly to the shaft in a manner that enhances the overall strength of the coupling without the use of keys. Because the through bolts advantageously in effect act as the keys for alignment purposes, the strength of the overall coupling is enhanced by directly transferring strength from the coupling to the shaft without the use of separate shaft keys.

More particularly, an industrial system according to the present invention preferably includes a drive such as motor, engine, or a turbine of a power generation system and a driven component such as a compressor or generator of a power generation system. Although the invention is applicable to various types of industrial systems, it is particularly advantageous for a power generation system and is described for clarity purposes herein in this context. A power generation system, for example, preferably includes a power generator having a generator rotor with a first rotor shaft and a turbine positioned to drive the generator and having a second turbine shaft. A first industrial coupling preferably is connected to the first shaft to couple the first shaft to the second shaft. The first coupling preferably has a first coupler portion mounted to and integrally formed with the first shaft. The first coupler portion preferably includes a first bore hole portion having a first plurality of notches formed therein, and a second coupler portion mounted on the first coupler portion and including a second bore hole portion having a second plurality of notches formed therein so that the combination of the first plurality of notches in the first bore portion and the second plurality of notches in the second bore portion define a first plurality of bore holes of the coupling. A second coupling preferably is connected to the second shaft and positioned adjacent the first coupling. The second coupling preferably has a second plurality of bore holes extending therethrough. Each of the second plurality of bore holes is preferably coaxially aligned with one of the first plurality of bore holes. A plurality of elongate throughbolts preferably is positioned through the first and second plurality of bore holes of the respective first and second couplings to connect the first coupling to the second coupling and thereby couple the first shaft to the second shaft.

The present invention also advantageously provides an industrial coupling preferably adapted to be positioned to connect a first shaft of a portion of an industrial system to a second shaft of a portion of an industrial system so that an industrial member having an opening formed therein and having a preselected opening diameter can be readily positioned over the coupling. The coupling preferably has a first coupler portion mounted to and integrally formed with the first shaft and having a first diameter less than the preselected opening diameter of the industrial member so that the industrial member can readily be positioned over the first coupler portion and onto the first shaft. The first coupler portion preferably includes a first bore hole portion having a first plurality of notches formed therein. The industrial coupling preferably also has a second coupler portion adapted to be mounted on, e.g., and more preferably heat shrunk on, the first coupler portion and having a second diameter greater than the preselected opening diameter of the industrial member when mounted on the first coupler portion so that the industrial member after being positioned onto the first shaft cannot be readily positioned over the coupling. The second coupler portion preferably includes a second bore hole portion having a second plurality of notches formed therein so that when the second coupler portion is mounted on the first coupler portion the combination of the first plurality of notches in the first bore portion and the second plurality of notches in the second bore portion define a plurality of bore holes of the coupling.

The present invention further advantageously provides a method of mounting an industrial member having an opening with a preselected opening diameter formed therein over a shaft. The method preferably includes positioning the industrial member over a first coupler portion of a coupling mounted to the first shaft. The first coupler portion preferably has a first diameter less than the preselected opening diameter of the industrial member so that the industrial member is readily positioned over the first coupler portion and onto the first shaft. The first coupler portion preferably has a first bore hole portion with a first plurality of notches formed therein. The method of mounting also preferably includes positioning a second coupler portion on the first coupler portion. The second coupler portion preferably has a second diameter greater than the preselected opening diameter of the industrial member when mounted on the first coupler portion so that the industrial member after being positioned onto the first shaft cannot be readily positioned over the coupling. The second coupler portion preferably includes a second bore hole portion with a second plurality of notches formed therein so that when the second coupler portion is mounted on the first coupler portion the combination of the first plurality of notches in the first bore portion and the second plurality of notches in the second bore portion define a plurality of bore holes of the coupling.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements in alternative embodiments.

Figure 1:
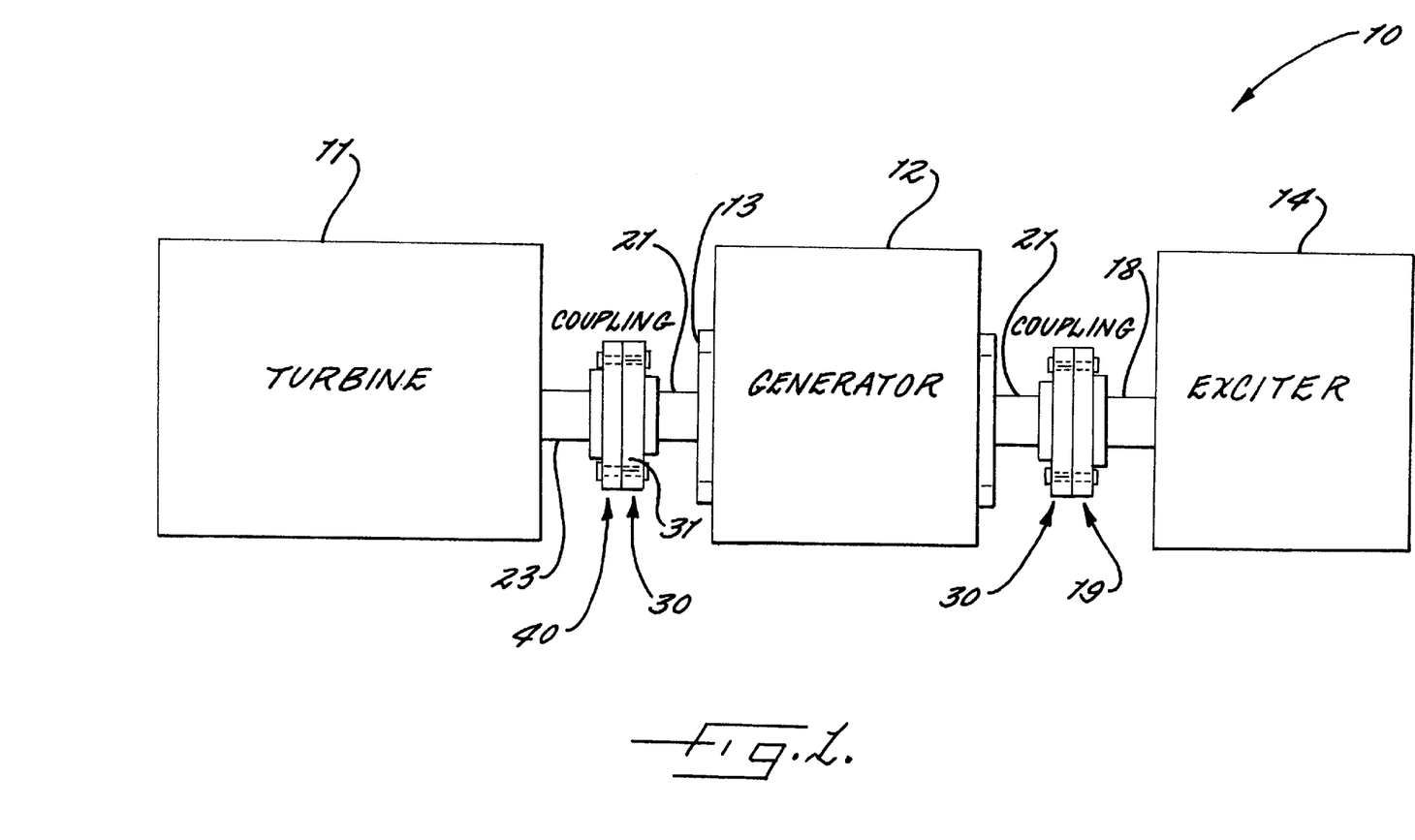
FIG. 1 is a schematic block diagram of a power generation system having a plurality of industrial couplings according to the present invention.
Figure 7:
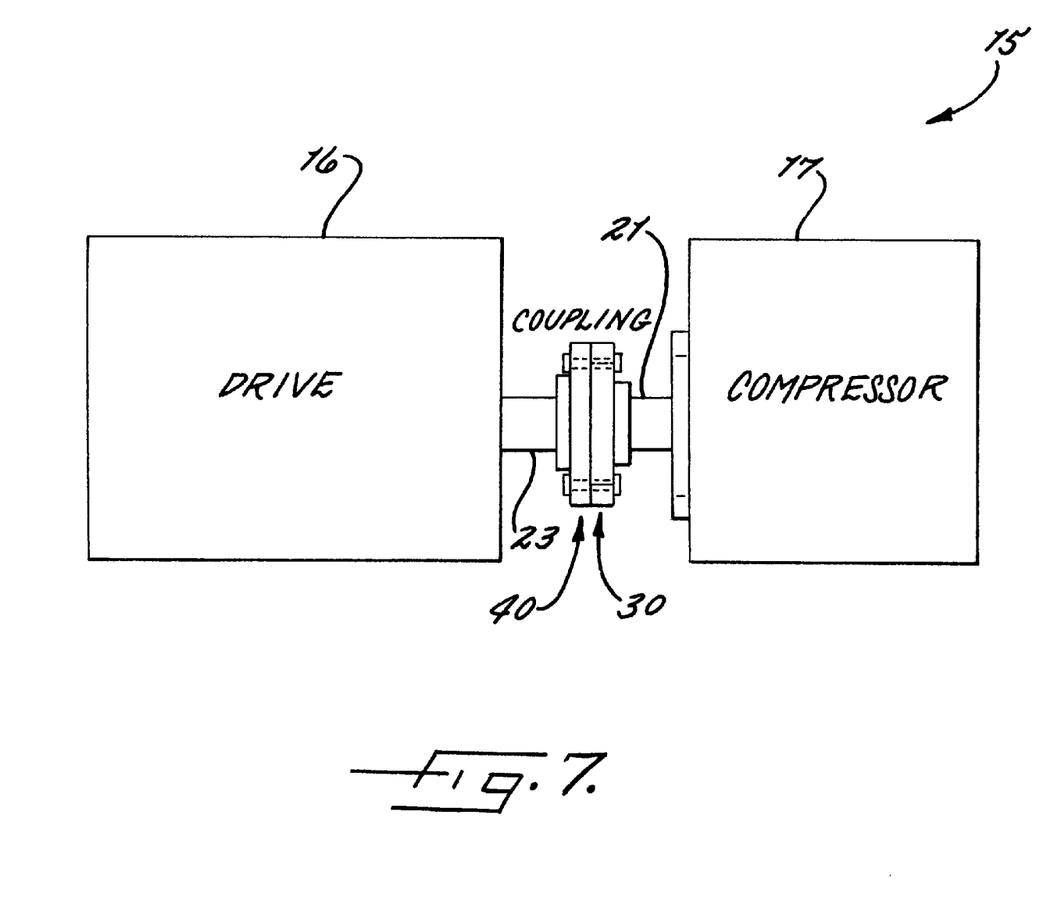
FIG. 7 is a schematic block diagram of an industrial system having an industrial coupling according to the present invention.

FIGS. 1 and 7 illustrate industrial systems 10, 15 having an industrial coupler 30 according to the present invention. The industrial systems 10, 15 preferably include a drive 16 such as a turbine 11 of a power generation system 10 and a compressor 17 such as a generator 12 of a power generation system 10. The system 15 can also include an exciter 14 also having an exciter shaft 18 and exciter coupling 19. Although the invention is applicable to various types of industrial systems, it is particularly advantageous for a power generation system 10 and will be described for clarity purposes herein in this context. A power generation system 10, for example, preferably has a power generator 12 having a generator rotor 13 including a first rotor shaft 21 and a turbine 11 positioned to drive the generator 12 and having a second turbine shaft 23. A first industrial coupling 30 is connected to the first shaft 21 to couple the first shaft 21 to the second shaft 23. The first coupling 30 preferably has a first coupler portion 31, such as a plate-like member, mounted to and integrally formed with the first shaft 21. The first coupler portion 31 preferably also includes a first bore hole portion 33 having a first plurality of notches 34 formed therein, and a second coupler portion 36 mounted on the first coupler portion 31 and including a second bore hole portion 37 having a second plurality of notches 38 formed therein so that the combination of the plurality of notches 34 in the first bore portion 33 and the plurality of notches 38 in the second bore portion 37 define a first plurality of bore holes 39 of the coupling 30. A second coupling 40 associated with the turbine 11 (or the exciter 14) preferably is connected to the second shaft 41 and positioned adjacent the first coupling 30. The second coupling 40 preferably has a second plurality of bore holes 49 extending therethrough. The second plurality of bore holes 49 each are preferably coaxially aligned with one of the first plurality of bore holes 39. A plurality of elongate through-bolts 50 preferably are positioned through the first and second plurality of bore holes 39, 49 of the respective first and second couplings 30, 40 to connect the first coupling 30 to the second coupling 40 and thereby couple the first shaft 21 to the second shaft 41.

Figures 4, 5:
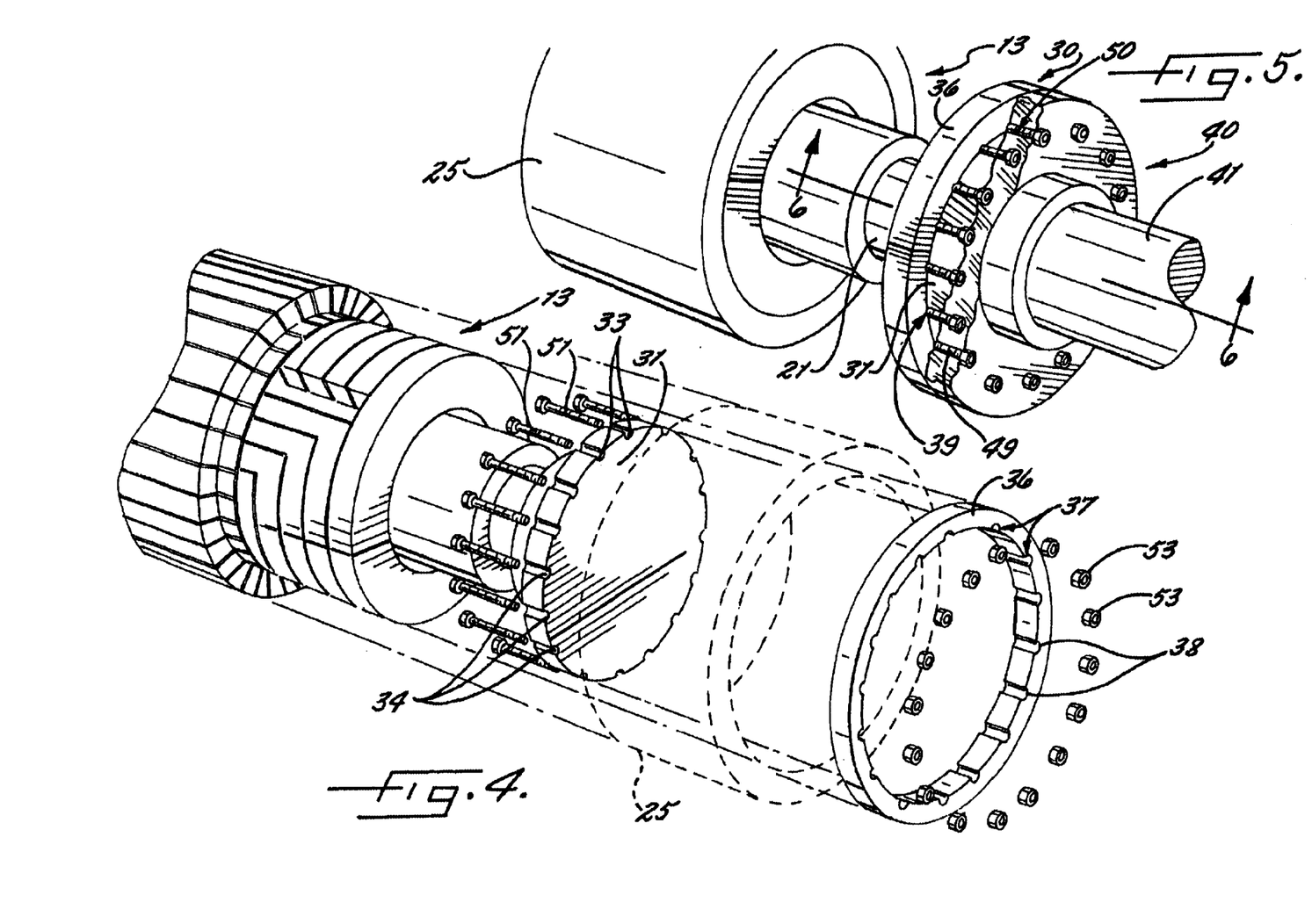
FIG. 4 is an exploded fragmentary perspective view of a generator rotor of a power generation system having an industrial coupling according to the present invention.
FIG. 5 is a fragmentary perspective view of a generator rotor of a power generation system having an industrial coupling according to the present invention.

As perhaps best shown in FIGS. 4–5, the second coupler portion 36 of the industrial coupling 30 preferably substantially surrounds the first coupler portion 31. Each of the first and second plurality of notches 34, 38 of the respective first and second coupler portions 31, 36 of the first coupling 30 are preferably spaced-apart and substantially surround the first shaft 21. The first and second coupler portions 31, 36 of the first coupling 30 preferably are each substantially annular in overall shape as shown. Each of the first plurality of notches 34 of the first coupler portion 31 is preferably provided by a recess formed in an annular-shaped outer peripheral surface. Each of the second plurality of notches 38 of the second coupler portion 36 also is preferably provided by a recess formed in an annular-shaped inner peripheral surface as shown. As well understood by those skilled in the art, each of the elongate through-bolts 50 preferably include a threaded bolt portion 51 and a threaded nut portion 53 threadingly fastened to the threaded bolt portion 51 (see FIGS. 4–5).

The first plurality of notches 34 formed in the first coupler portion 31 substantially overlie the second plurality of notches 38 formed in the second coupler portion 36. The second coupler portion 36 of the first coupling 30 preferably is heat shrunk onto the first coupler portion 31 as understood by those skilled in the art. The system 10 can also include at least one end winding rotor retaining ring 25 mounted to the generator rotor 13 to retain end windings 26 of the coils 24 of the rotor 13 therein. The opening in the retaining ring 25 preferably has an inside diameter greater than the outside diameter of the first coupler portion 31 and less than the outside diameter of the first coupling 30 (see FIGS. 4–5).

Figure 6:
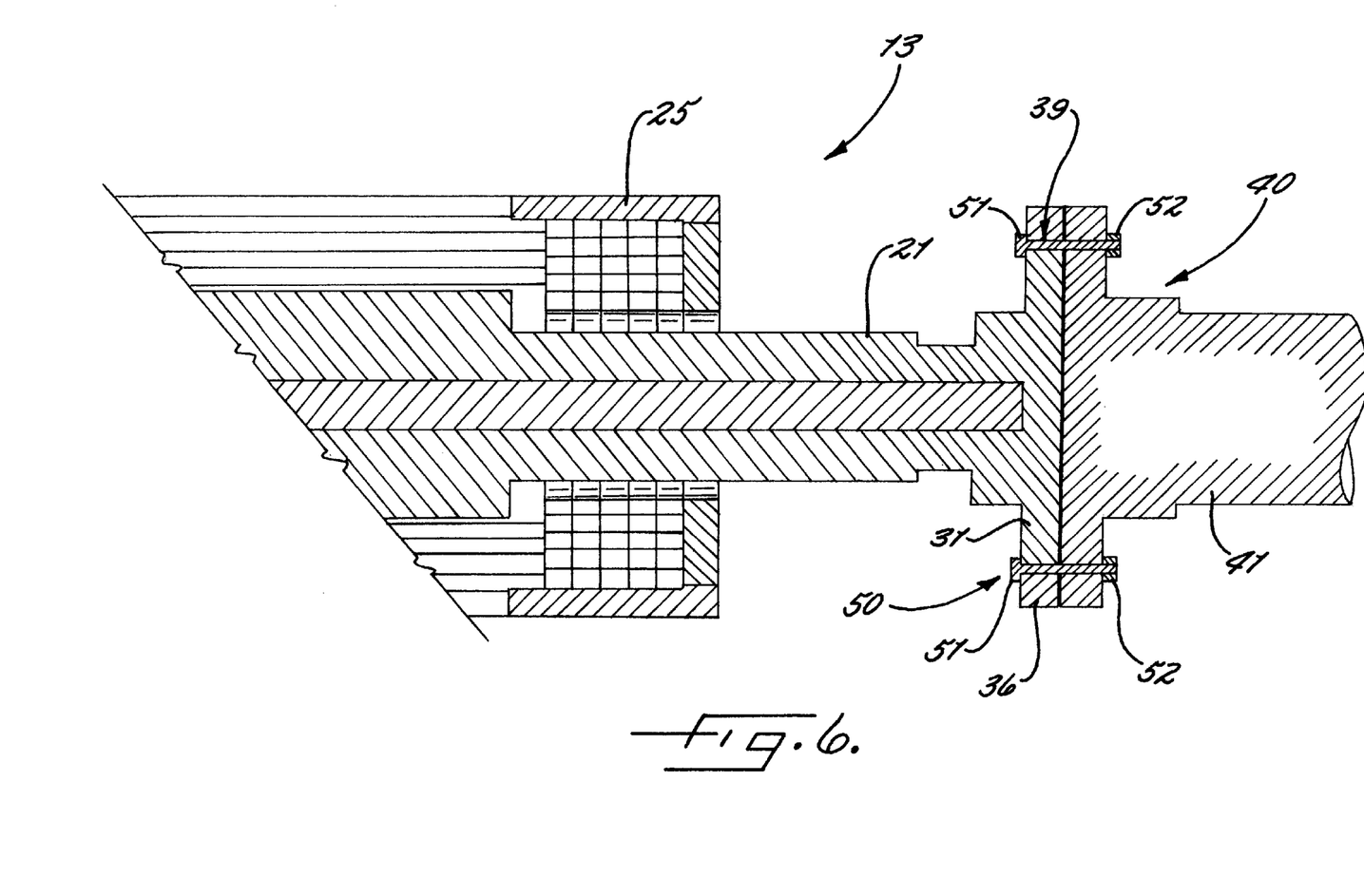
FIG. 6 is a sectional view of a generator rotor of a power generation system having an industrial coupling taken along line 6—6 of FIG. 5 according to the present invention.

As perhaps best shown in FIGS. 4–6, an industrial coupling 30 according to the present invention is preferably adapted to be positioned to connect a first shaft 21 of a portion of an industrial system 10, 15 to a second shaft 41 of a portion of an industrial system 10, 15 so that an industrial member such as a retaining ring 25, an end plate, a blower hub, a blower hub spacer, or other types of industrial members, having an opening formed therein and having a preselected opening diameter can be readily positioned over the first coupler portion 31. The coupling 30 preferably has a first coupler portion 31 mounted to and integrally formed with the first shaft 21 and has a first diameter less than the preselected opening diameter of the industrial member 25 so that the industrial member 25 can readily be positioned over the first coupler portion 31 and onto the first shaft 21. The first coupler portion 31 preferably includes a first bore hole portion 33 having a first plurality of notches 34 formed therein. The industrial coupling 30 preferably also has a second coupler portion 36 adapted to be mounted on the first coupler portion 31. The second coupler portion 36 preferably has a second diameter greater than the preselected opening diameter of the industrial member 25 when mounted on the first coupler portion 31 so that the industrial member 25 after being positioned onto the first shaft 21 cannot be readily positioned over the coupling 30. The second coupler portion 36 preferably includes a second bore hole portion 37 having a second plurality of notches 38 formed therein so that when the second coupler portion 36 is mounted on the first coupler portion 31 the combination of the first plurality of notches 34 in the first bore portion 33 and the second plurality of notches 38 in the second bore portion 37 define a first plurality of bore holes 39 of the coupling 30.

As shown, the second coupler portion 36 preferably substantially surrounds the first coupler portion 31. Each of the first and second plurality of notches 34, 38 of the respective first and second coupler portions 31, 36 of the first coupling 30 are spaced-apart and substantially surround the first shaft 21. The first and second coupler portions 31, 36 of the first coupling 30 are each substantially annular in overall shape. Each of the first plurality of notches 34 of the first coupler portion 31 is preferably provided by a recess formed in an annular-shaped outer peripheral surface. Also, each of the second plurality of notches 38 of the second coupler portion 36 is preferably provided by a recess formed in an annular-shaped inner peripheral surface.

As described previously above, the first plurality of notches 34 formed in the first coupler portion 31 substantially overlie the second plurality of notches 38 formed in the second coupler portion 36. The second coupler portion 36 of the first coupling 30 preferably is heat shrunk onto the first coupler portion 31. The first shaft 21 is preferably a generator rotor shaft, the second shaft 41 is preferably a turbine shaft or an exciter shaft 18, and the industrial member 25 is preferably an end winding rotor retaining ring.

Figures 2, 3:
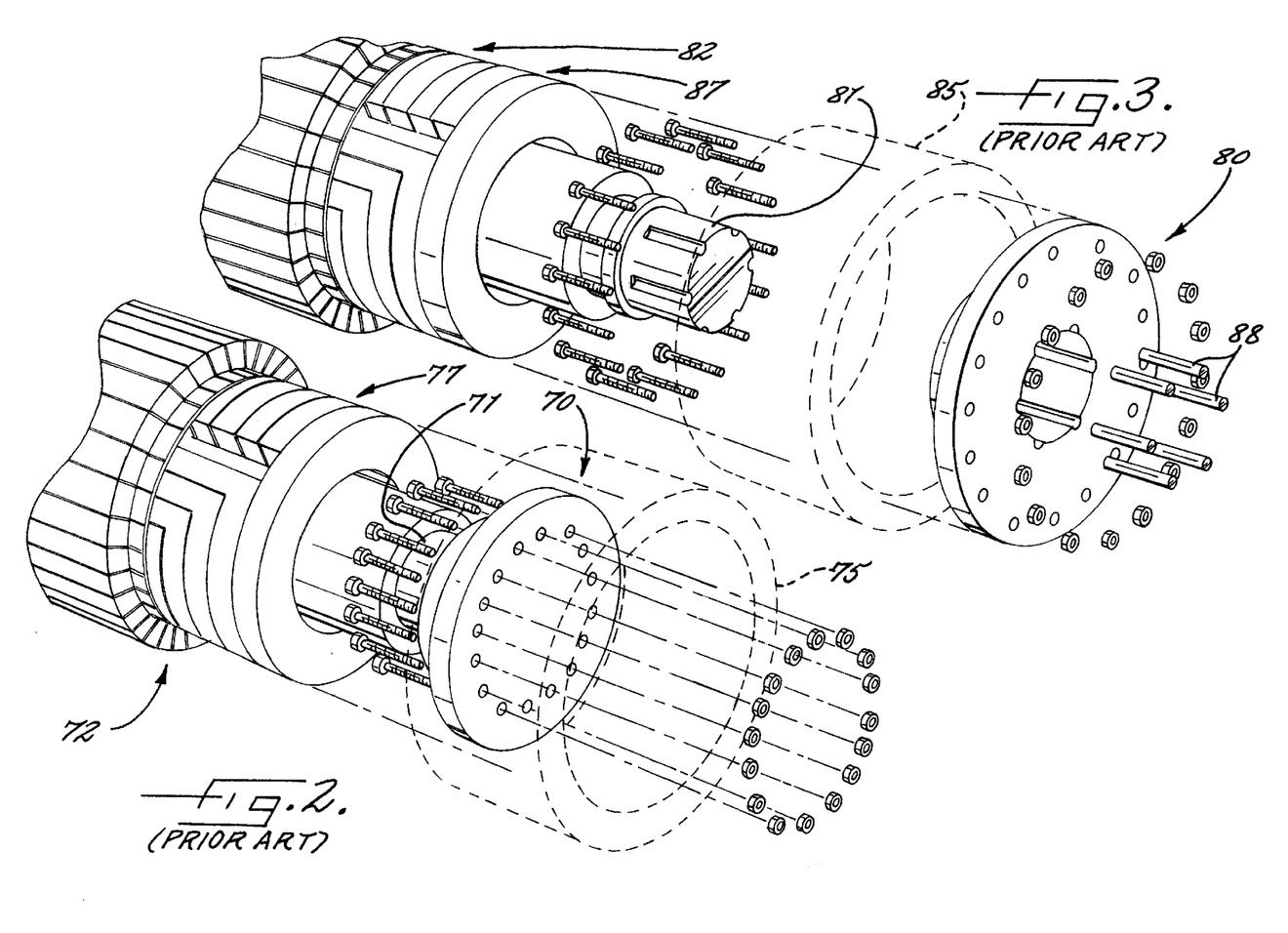
FIG. 2 is an exploded fragmentary perspective view of a first embodiment of a generator rotor having an industrial coupling according to the prior art.
FIG. 3 is an exploded fragmentary perspective view of a second embodiment of a generator rotor having an industrial coupling according to the prior art.

As shown in FIGS. 1–7 and as described above, the present invention also includes methods of using an industrial coupler 30 and methods of mounting an industrial member 25 such as retaining rings, end plates, blower hubs, blower hub spacers, or other types of industrial members. A method of mounting an industrial member 25 having an opening with a preselected opening diameter formed therein over a shaft 21 preferably includes positioning the industrial member 25 over a first coupler portion 31 of a coupling mounted to the first shaft 21. The first coupler portion 31 preferably has a first diameter less than the preselected opening diameter of the industrial member 25 so that the industrial member 25 is readily positioned over the first coupler portion 31 and onto the first shaft 21. The first coupler portion 31 preferably has a first bore hole portion 33 with a first plurality of notches 34 formed therein. The method of mounting also preferably includes positioning a second coupler portion 36 on the first coupler portion 31. The second coupler portion 36 preferably has a second diameter greater than the preselected opening diameter of the industrial member 25 when mounted on the first coupler portion 31 so that the industrial member 25 after being positioned onto the first shaft 21 cannot be readily positioned over the coupling 30. If the outside diameter of the second coupler portion 36 was less than the inside diameter of the industrial member 25, for example, then an integral coupling such as shown in FIG. 2 (Prior Art) can be used instead, if desired. The second coupler portion 36 preferably includes a second bore hole portion 37 with a second plurality of notches 38 formed therein so that when the second coupler portion 36 is mounted on the first coupler portion 31 the combination of the first plurality of notches 34 in the first bore portion 33 and the second plurality of notches 38 in the second bore portion 37 define a first plurality of bore holes 39 of the coupling 30.

The method can also have the positioning of the second coupler portion step to include positioning the second coupler portion 36 to substantially surround and abuttingly contact the first coupler portion 31, and heat shrinking the second coupler portion 36 to the first coupler portion 31. The positioning step can further include aligning the second plurality of notches 38 with the first plurality of notches 34 so that each one of the second plurality of notches 38 either substantially overlies or underlies one of the first plurality of notches 34. According to the method, the first coupler portion 31 of the coupling 30 preferably is integrally formed with the shaft 21 to thereby allow the first coupler portion 31 and the shaft 21 to be formed as a single shaft and coupler portion combination. Also, the shaft 21, for example, can be a generator rotor shaft, and the industrial member 25 can be an end winding rotor retaining ring as described and shown herein.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That claimed is:

1. An industrial coupling adapted to be positioned to connect a first shaft of a portion of an industrial system to a second shaft of a portion of an industrial system, the coupling comprising:

a first coupler portion integrally formed from the first shaft, the first coupler portion including a first bore hole portion having a first plurality of notches formed therein substantially uniformly about a diameter that is greater than the diameter of the first shaft;

a second coupler portion mounted on the first coupler portion, the second coupler portion including a second bore hole portion having a second plurality of notches formed therein so that the combination of the first plurality of notches in the first bore portion and the second plurality of notches in the second bore portion define a plurality of bore holes of the coupling; and a plurality of threaded bolts that fit the bore holes of the coupling and that perform the function of both a clamping bolt and a key.

2. A coupling as defined in claim 1, wherein the second coupler portion substantially surrounds the first coupler portion, and wherein each of the first and second plurality of notches of the respective first and second coupler portions of the first coupling are spaced-apart and substantially surround the first shaft.

3. A coupling as defined in claim 2, wherein the first and second coupler portions of the first coupling are each substantially annular in overall shape, wherein each of the first plurality of notches of the first coupler portion comprises a recess formed in an annular-shaped outer peripheral surface, wherein each of the second plurality of notches of the second coupler portion comprises a recess formed in an annular-shaped inner peripheral surface.

4. A coupling as defined in claim 3, wherein the first plurality of notches formed in the first coupler portion substantially overlie the second plurality of notches formed in the second coupler portion, and wherein the second coupler portion of the first coupling is heat shrunk onto the first coupler portion.

5. A coupling as defined in claim 4, wherein the first shaft comprises a generator rotor shaft, and wherein the second shaft comprises a turbine shaft.

6. An industrial coupling adapted to be positioned to connect a first shaft of a portion of an industrial system to a second shaft of a portion of an industrial system so that an industrial member having an opening formed therein and having a preselected opening diameter can be readily positioned over the coupling, the coupling comprising:

a first coupler portion integrally formed from the first shaft and having a first diameter greater than the diameter of the first shaft but less than the preselected opening diameter of the industrial member so that the industrial member can readily be positioned over the first coupler portion and onto the first shaft, the first coupler portion including a first bore hole portion having a first plurality of notches formed therein;

a second coupler portion adapted to be mounted on the first coupler portion and having a second diameter greater than the preselected opening diameter of the industrial member when mounted on the first coupler portion so that the industrial member after being positioned onto the first shaft cannot be readily positioned over the coupling, the second coupler portion including a second bore hole portion having a second plurality of notches formed therein so that when the second coupler portion is mounted on the first coupler portion the combination of the first plurality of notches in the first bore portion and the second plurality of notches in the second bore portion define a plurality of bore holes of the coupling; and a plurality of threaded bolts that fit the bore holes of the coupling and that perform the function of both a clamping bolt and a key.

7. A coupling as defined in claim 6, wherein the second coupler portion substantially surrounds the first coupler portion, and wherein each of the first and second plurality of notches of the respective first and second coupler portions of the first coupling are spaced-apart and substantially surround the first shaft.

8. A coupling as defined in claim 7, wherein the first and second coupler portions of the first coupling are each substantially annular in overall shape, wherein each of the first plurality of notches of the first coupler portion comprises a recess formed in an annular-shaped outer peripheral surface, wherein each of the second plurality of notches of the second coupler portion comprises a recess formed in an annular-shaped inner peripheral surface.

9. A coupling as defined in claim 8, wherein the first plurality of notches formed in the first coupler portion substantially overlie the second plurality of notches formed in the second coupler portion, and wherein the second coupler portion of the first coupling is heat shrunk onto the first coupler portion.

10. A coupling as defined in claim 6, wherein the first shaft comprises a compressor shaft, wherein the second shaft comprises a drive shaft.

11. A power generation system comprising:

a power generator having a generator rotor including a first shaft;

a turbine positioned to drive the generator and having a second shaft;

a first coupling connected to the first shaft to couple the first shaft to the second shaft, the first coupling having a first coupler portion mounted to and integrally formed with the first shaft and including a first bore hole portion having a first plurality of notches formed therein, and a second coupler portion mounted on the first coupler portion and including a second bore hole portion having a second plurality of notches formed therein so that the combination of the plurality of notches in the first bore portion and the plurality of notches in the second bore portion define a first plurality of bore holes of the coupling;

a second coupling connected to the second shaft and positioned adjacent the first coupling, the second coupling having a second plurality of bore holes extending therethrough, the second plurality of bore holes each being coaxially aligned with one of the first plurality of bore holes; and a plurality of elongate through-bolts positioned through the first and second plurality of bore holes of the respective first and second couplings to connect the first coupling to the second coupling and thereby couple the first shaft to the second shaft.

12. A system as defined in claim 11, wherein the second coupler portion substantially surrounds the first coupler portion, and wherein each of the first and second plurality of notches of the respective first and second coupler portions of the first coupling are spaced-apart and substantially surround the first shaft.

13. A system as defined in claim 12, wherein the first and second coupler portions of the first coupling are each substantially annular in overall shape, wherein each of the first plurality of notches of the first coupler portion comprises a recess formed in an annular-shaped outer peripheral surface, wherein each of the second plurality of notches of the second coupler portion comprises a recess formed in an annular-shaped inner peripheral surface, and wherein each of the elongate through-bolts include a threaded bolt portion and a threaded nut portion threadingly fastened to the threaded bolt portion.

14. A system as defined in claim 11, wherein the first plurality of notches formed in the first coupler portion substantially overlie the second plurality of notches formed in the second coupler portion, and wherein the second coupler portion of the first coupling is heat shrunk onto the first coupler portion.

15. A system as defined in claim 11, further comprising an end winding rotor retaining ring mounted to the generator rotor to retain end windings of the rotor therein, the retaining ring having an inside diameter greater than the outside diameter of the first coupler portion and less than the outside diameter of the first coupling.

* * * * *